United States Patent [19]
Morioka

[11] Patent Number: 5,721,480
[45] Date of Patent: Feb. 24, 1998

[54] SYSTEM AND METHOD FOR CONTROLLING CHARGING OF SECONDARY BATTERY THAT REQUIRES CONSTANT-VOLTAGE CHARGE CONTROL

[75] Inventor: Shizuo Morioka, Hanno, Japan

[73] Assignee: Kabushiki Kaisha Toshiba, Kawasaki, Japan

[21] Appl. No.: 790,556

[22] Filed: Jan. 29, 1997

[30] Foreign Application Priority Data

Jan. 31, 1996 [JP] Japan ............................ 8-016153

[51] Int. Cl.$^6$ ................................. H01M 10/46
[52] U.S. Cl. ................................. 320/30; 320/49
[58] Field of Search ........................ 320/5, 14, 21, 320/27, 29, 30, 32, 37, 39, 48, 49, 54

[56] References Cited

U.S. PATENT DOCUMENTS

| | | | |
|---|---|---|---|
| 5,397,979 | 3/1995 | Yamamoto | 323/281 |
| 5,581,772 | 12/1996 | Nanno et al. | 395/750 |
| 5,617,007 | 4/1997 | Keidl et al. | 320/21 X |

OTHER PUBLICATIONS

Benjamin C. Kuo, Digital Conrol Systems pp. 22–27, 64–67; (English translations), no date.
Data Acquisition Databook 1995 Edition, pp. 6-4—6-14.

*Primary Examiner*—Edward Tso
*Attorney, Agent, or Firm*—Finnegan, Henderson, Farabow, Garrett & Dunner, L.L.P.

[57] ABSTRACT

In a system for charging a rechargeable battery with constant voltage, a power supply supplies a voltage increased with time. An overvoltage generating circuit outputs an overvoltage signal for a first predetermined period when a supplied voltage to the rechargeable battery exceed a reference voltage. In response to the overvoltage signal from the overvoltage generating circuit, a multivibrator gradually drops the voltage from the power supply for a second predetermined period being longer than the first period. A sample/hold circuit holds the voltage from the power supply when a control signal is not supplied, and samples the voltage from the power supply when the control signal is supplied. A comparator compares the voltage from the power supply with a held voltage of the sample/hold circuit, and generates a signal when the voltage from the power supply is higher than the held voltage of the sample/hold circuit. A logical sum circuit supplies the control signal to the sample/hold circuit in response to the signal from the comparator or the overvoltage signal from the overvoltage generating circuit. A voltage follower supplies the held or the sampled voltage from the sample/hold circuit to the rechargeable battery.

26 Claims, 13 Drawing Sheets

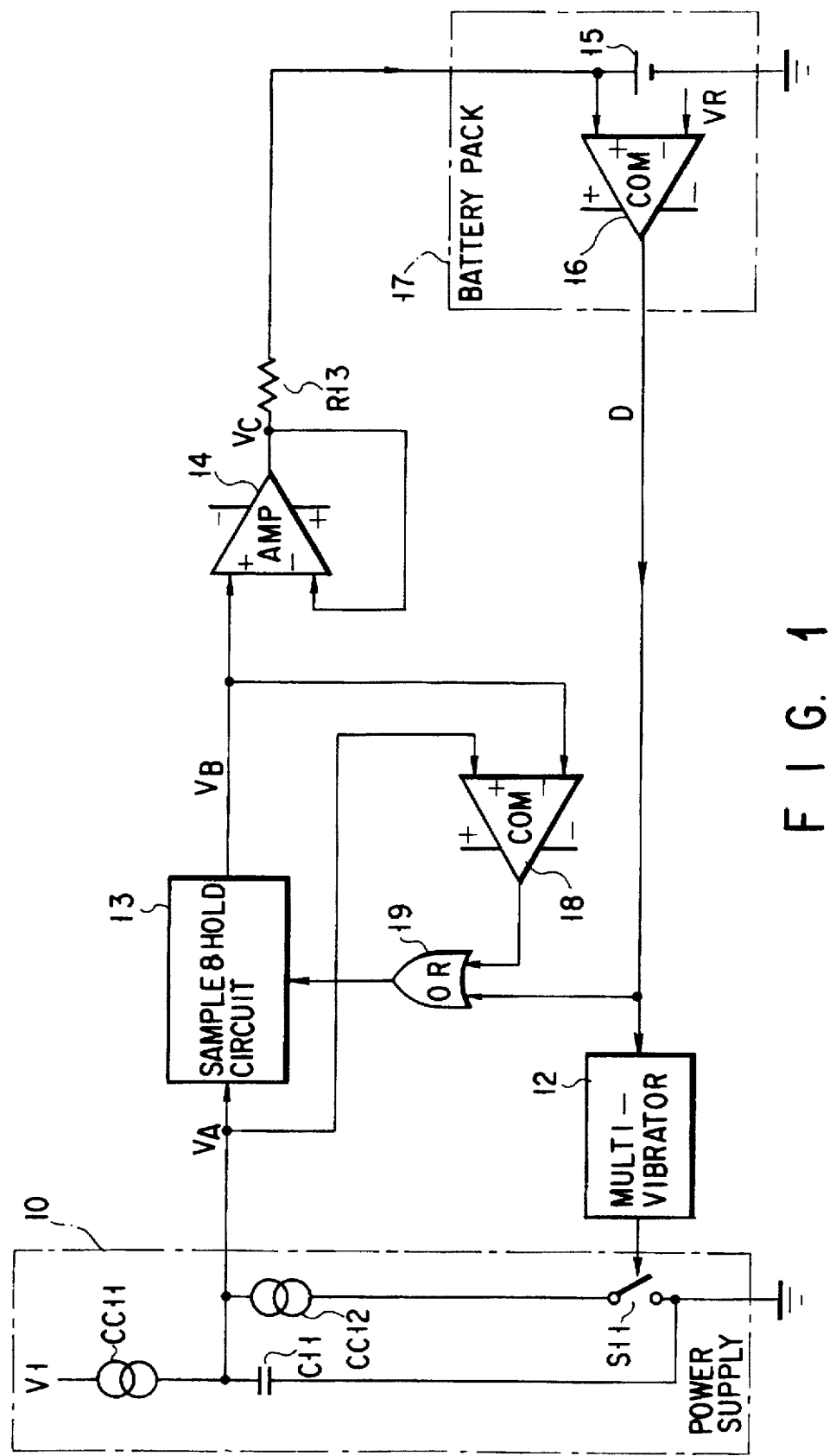
F I G. 1

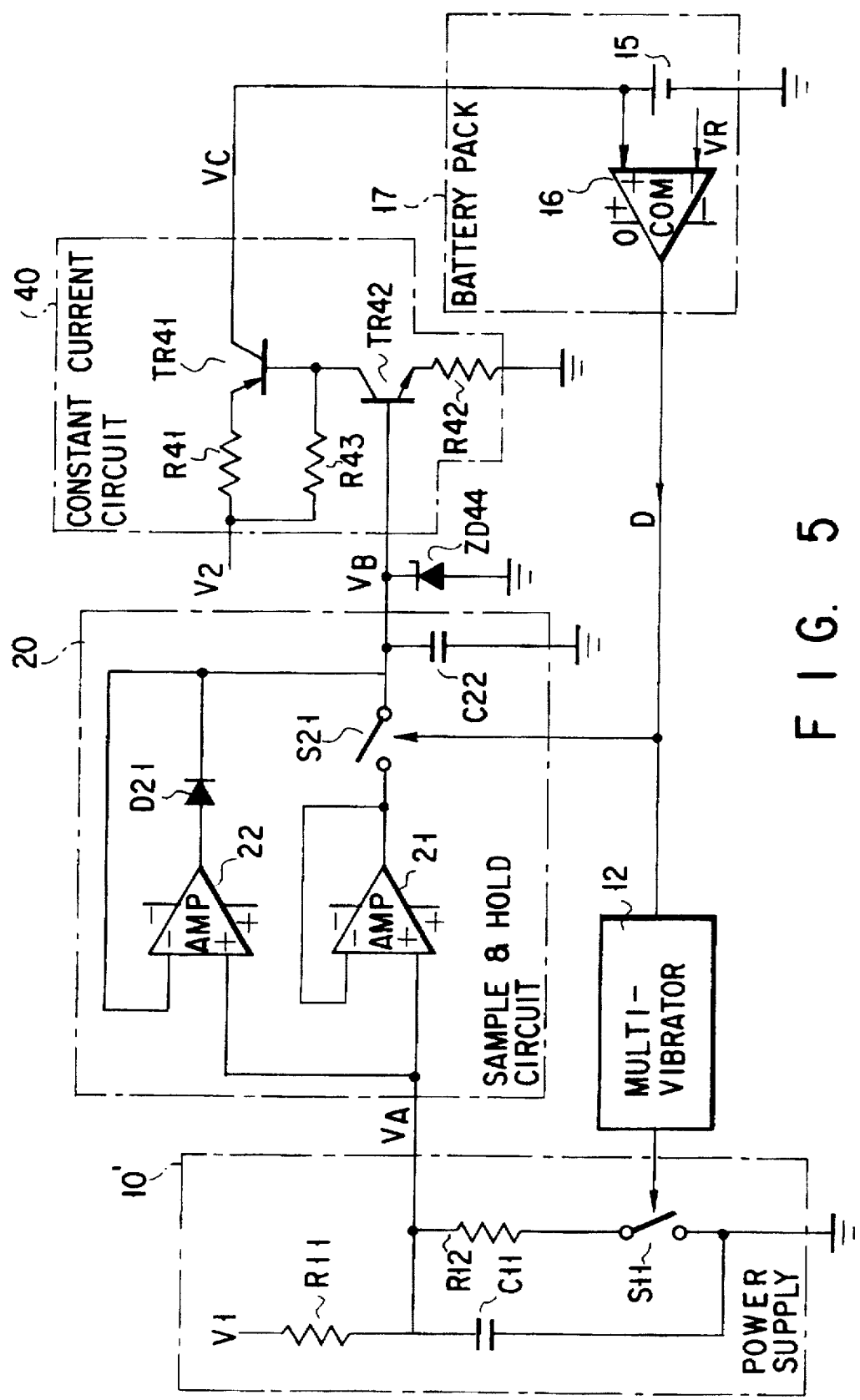
F I G. 5

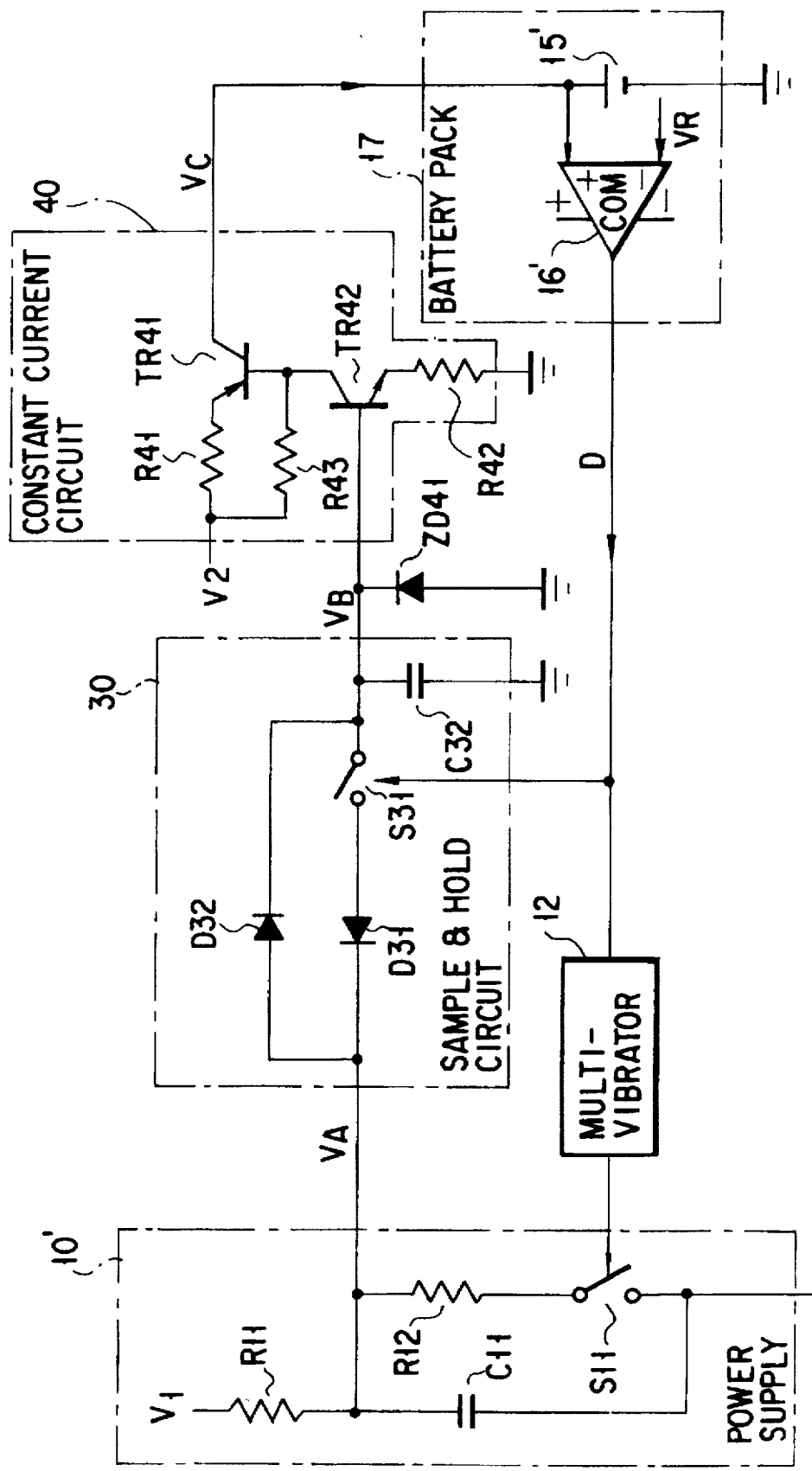
F I G. 6

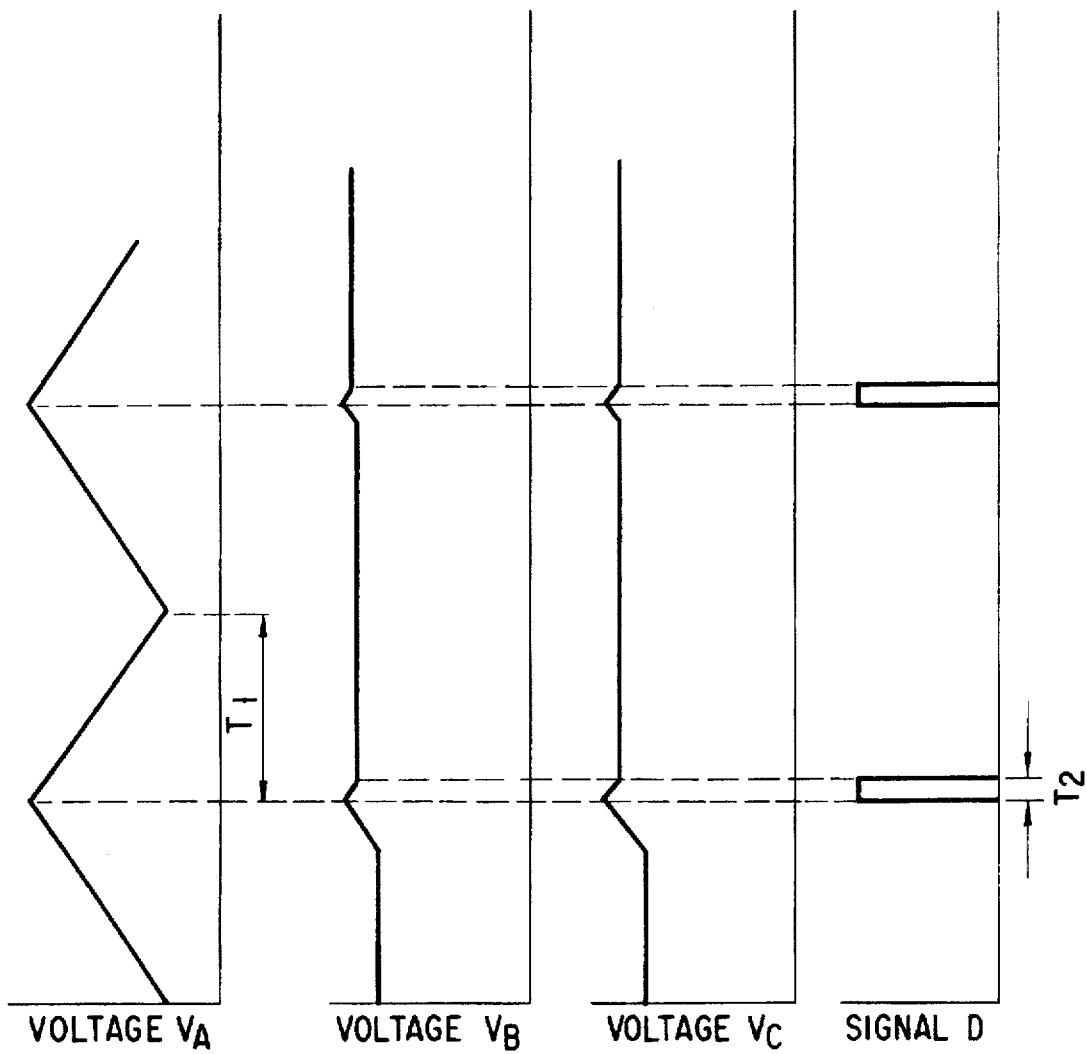

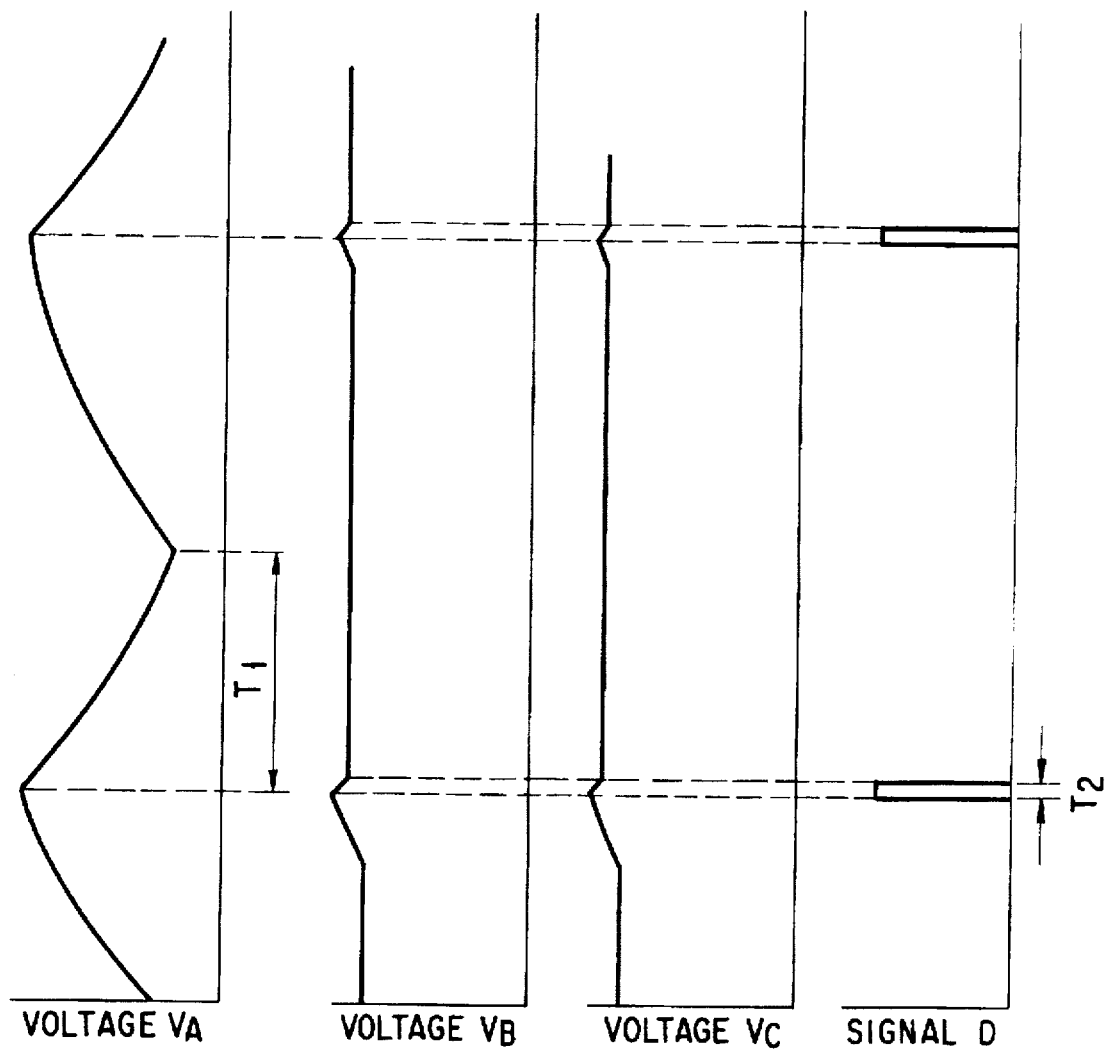

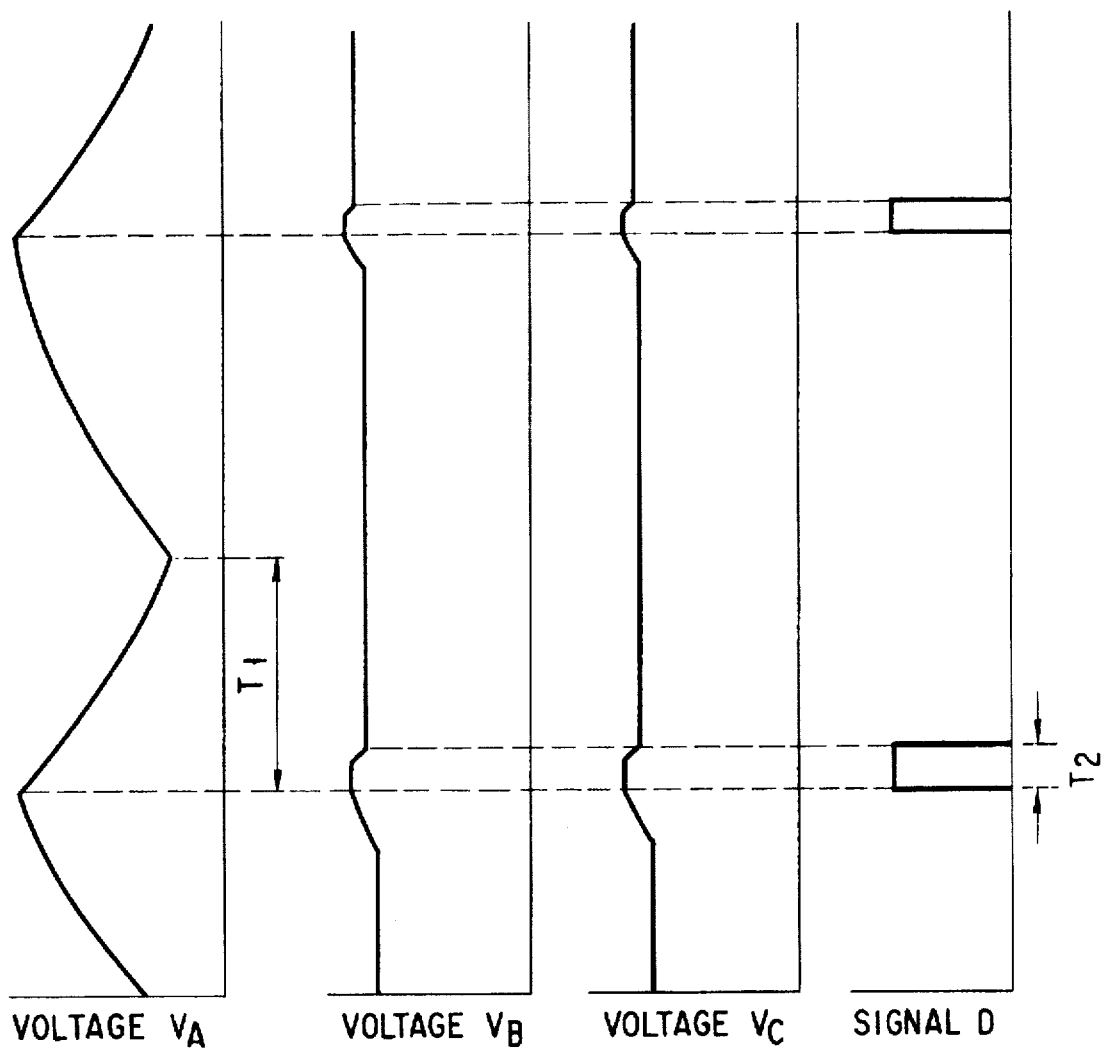

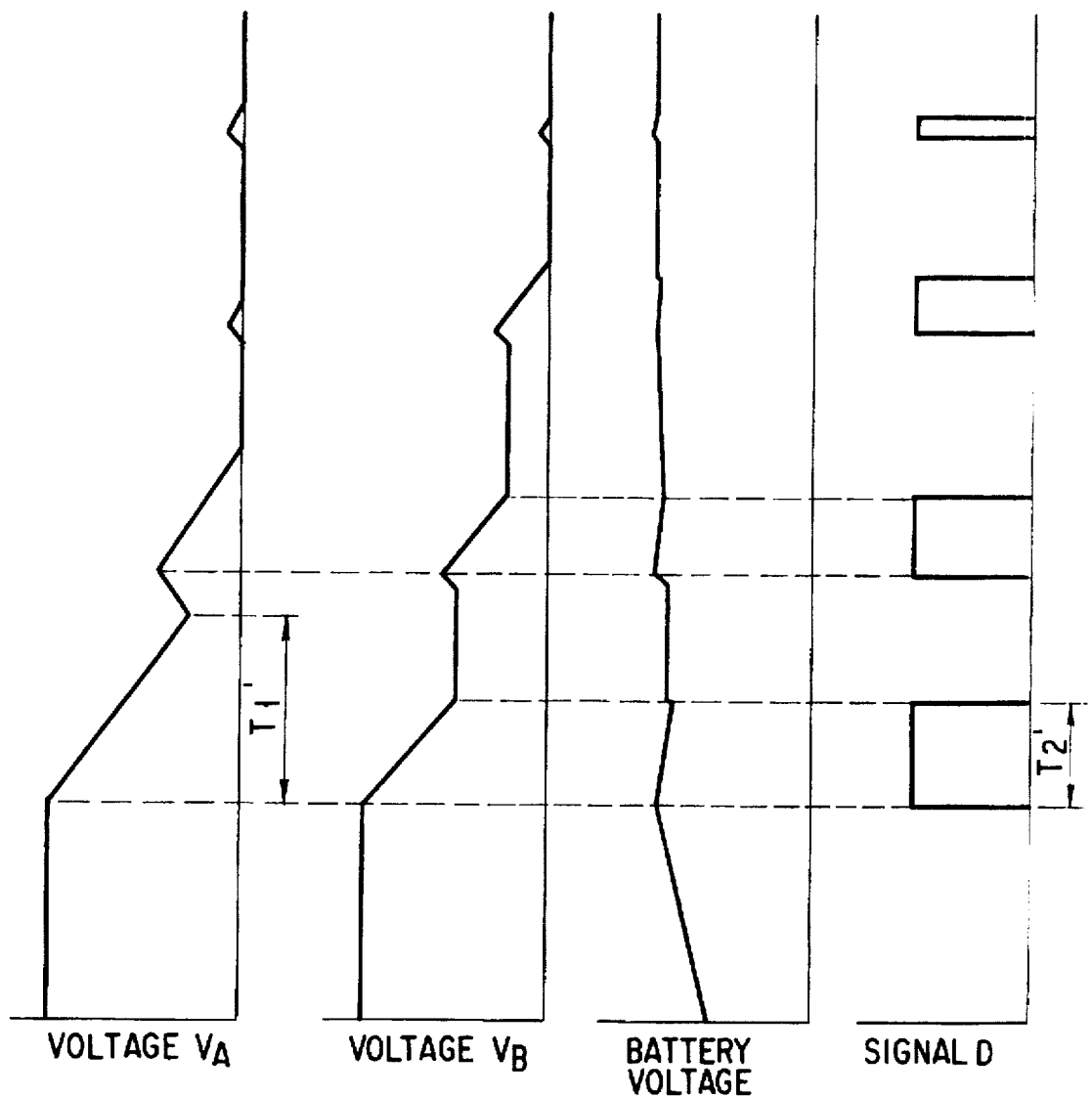

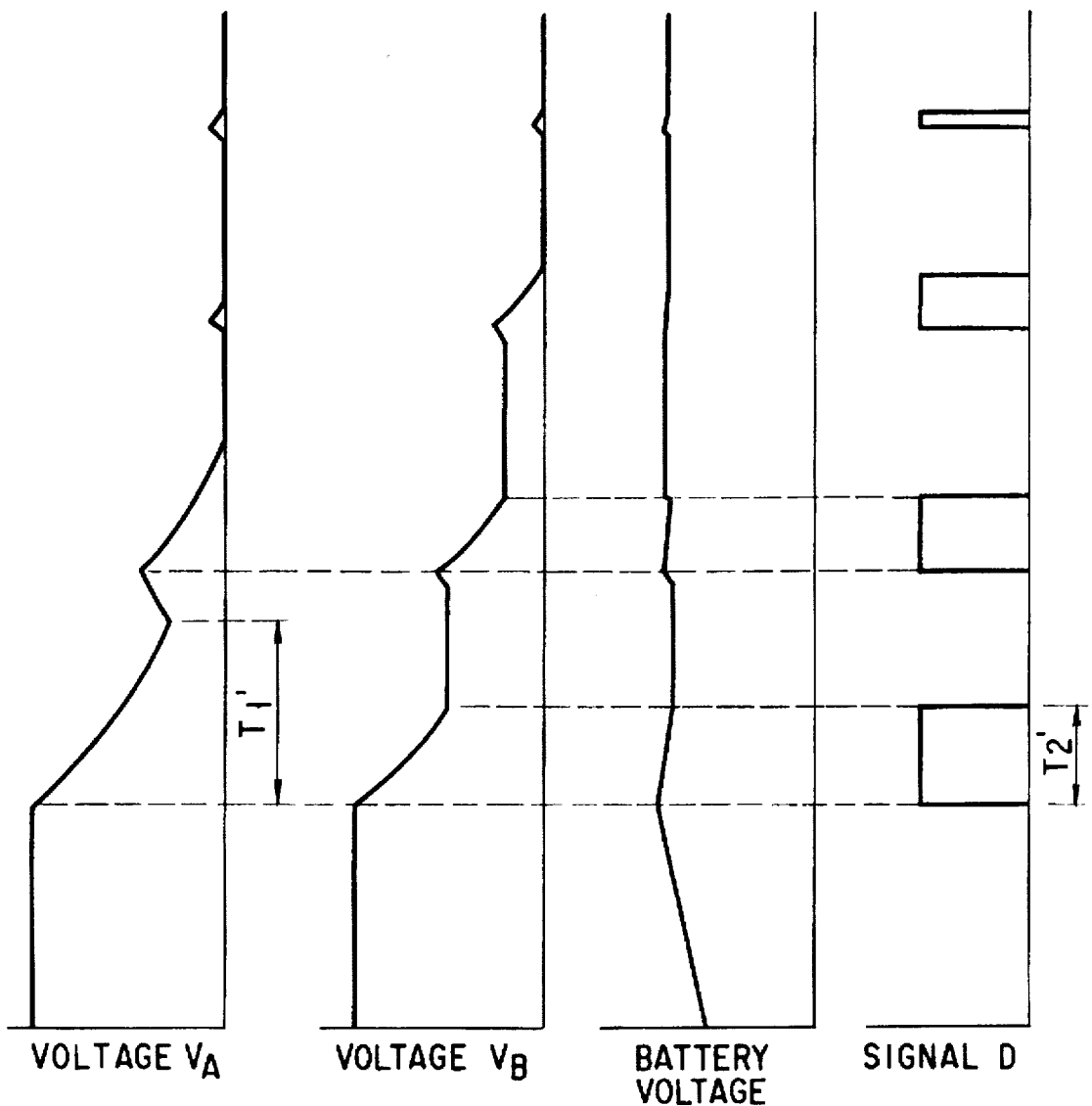

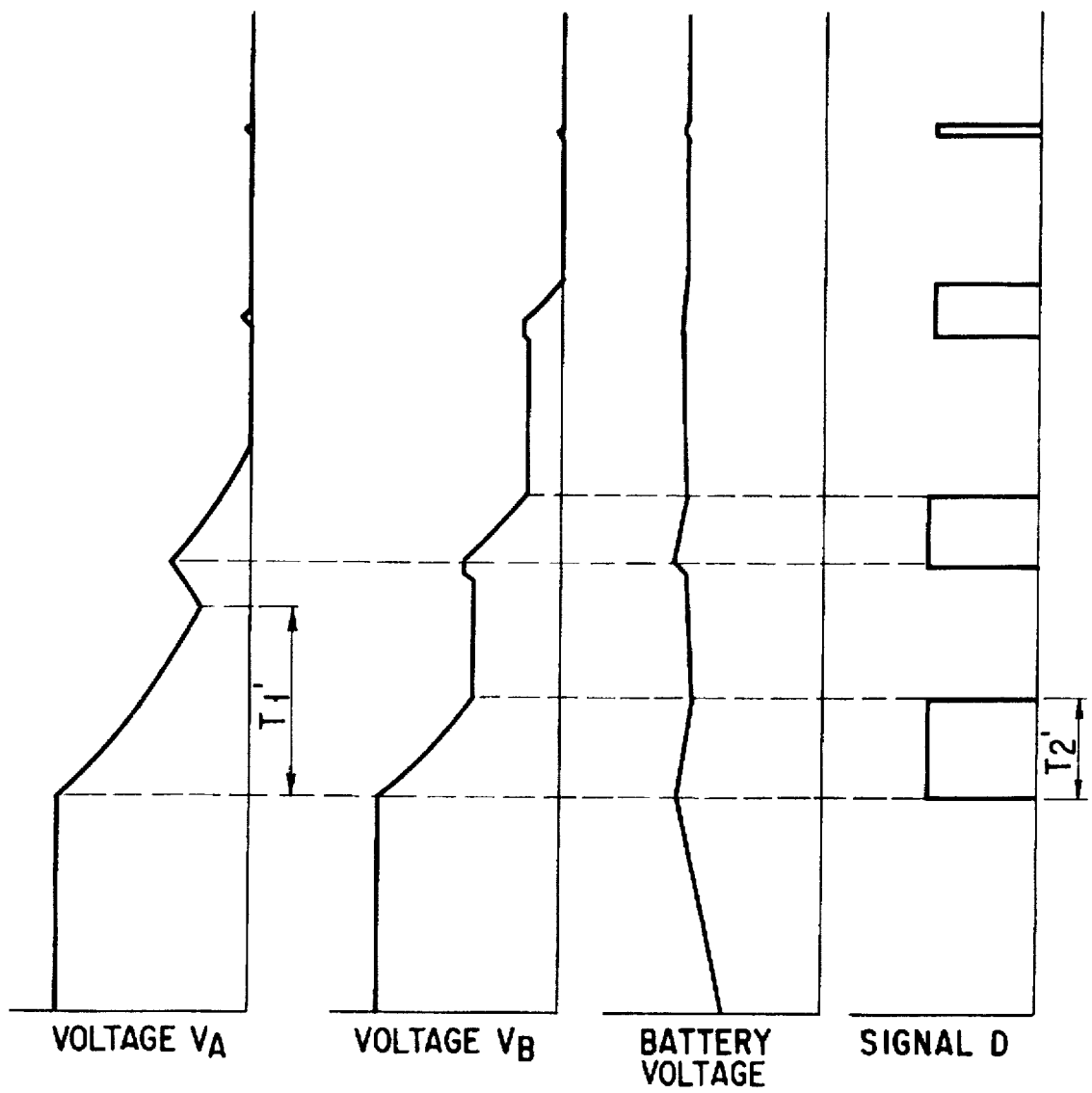

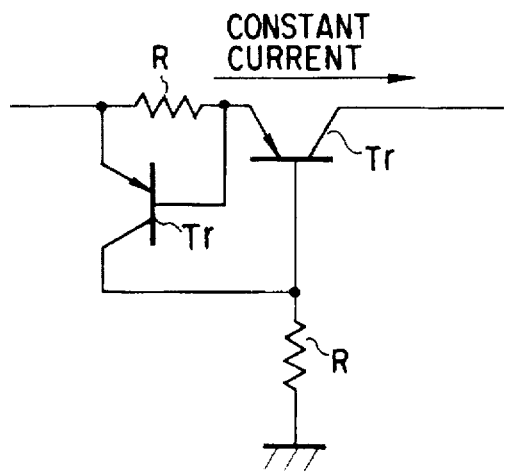
F I G. 13A
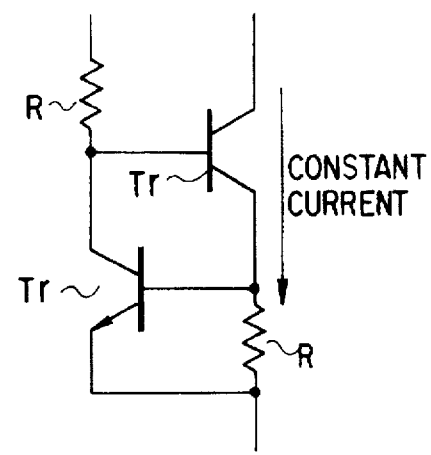
F I G. 13B
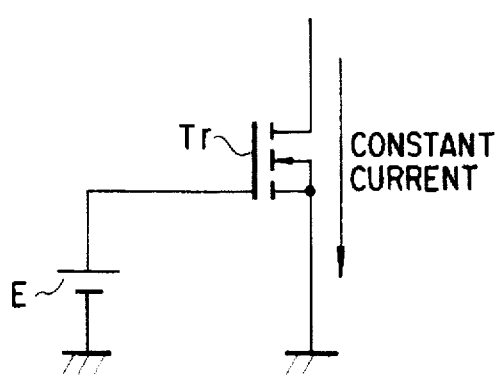
F I G. 13C
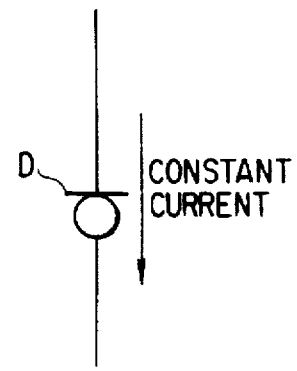
F I G. 13D
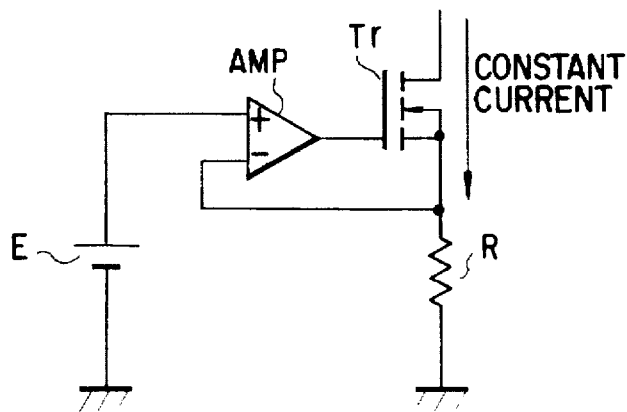
F I G. 13E
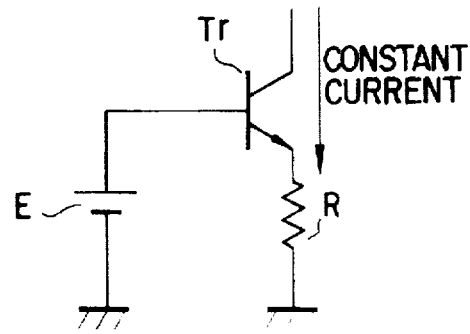
F I G. 13F 5,721,480

SYSTEM AND METHOD FOR CONTROLLING CHARGING OF SECONDARY BATTERY THAT REQUIRES CONSTANT-VOLTAGE CHARGE CONTROL

BACKGROUND OF THE INVENTION

The present invention relates to a system and method for controlling charging of a rechargeable battery that requires constant-voltage charge, such as a lithium-ion battery.

As power supplies for personal computers, rechargeable batteries that require constant-voltage charge, such as lithium-ion batteries, are used widely. With this type of rechargeable battery, the higher the charge control voltage, the higher the charged capacity becomes (naturally, the discharged capacity also increases). On the other hand, the safety constraints require the charge control voltage to be limited to a fixed voltage or below. For this reason, it is required to perform charge control at a voltage that is as high as possible and below a limited value.

The conventional charge control of a rechargeable battery is implemented by a circuit for detecting overvoltage of the rechargeable battery and a circuit for controlling the charging of the battery, each of the circuits using a separate reference voltage. Taking the accuracy of each reference voltage into consideration, the charge control voltage is unavoidably set so low that the condition that "overvoltage detected value>charge control voltage" is always satisfied.

To overcome this drawback, a charge control system for a rechargeable battery requiring constant-voltage charge control is disclosed in U.S. Pat. No. 08/395,504. This system comprises a rechargeable battery and a charger. The battery is provided with overvoltage detecting means and storage means for storing information sent from the charger. The charger is provided with constant-voltage control means, supply voltage detecting means, means for reading an overvoltage detect signal from the rechargeable battery, means for sending information to the storage means in the rechargeable battery, and means for reading information from the storage means in the battery. The system is arranged such that the charger gradually increases the charging voltage and determines a constant-voltage charge control voltage from the supply voltage when overvoltage is detected, and the control voltage value and charger identification information are stored in the storage means in the battery. If, when a rechargeable battery is mounted on the charger, the charger identification information in the battery corresponds to that for that charger, then it will perform charge control with a control voltage whose value has been stored in it. That is, the charger can perform charge control on the battery with a voltage that is high, but not so high as to provide overvoltage.

The above-described system can solve conventional problems such as of incapability of providing effective utilization of the performance of rechargeable batteries, but, on the other hand, it has a problem of being costly because it is required to produce a reference voltage that has little temperature-dependence, little change with aging, and a high resolution. Moreover, it has a problem that a charge control voltage must be corrected according to a charging current. Furthermore, it has a problem that the charge control voltage must be corrected for a lag between the moment that overvoltage is detected and the moment that an overvoltage signal is actually received.

The problems with the conventional technique described above are summarized as follows.

That is, the charge control system that performs charge control with a voltage that is high, but not so high as to provide overvoltage is costly because it is required to produce a reference voltage that has little temperature-dependence, little change with aging, and a high resolution. Moreover, a charge control voltage must be corrected according to a charging current. Furthermore, the charge control voltage must be corrected for a lag between the moment that overvoltage is detected and the moment that an overvoltage signal is actually received.

BRIEF SUMMARY OF THE INVENTION

Accordingly, it is an object of the present invention to provide a charge control system and a charging method of high precision, low cost and high reliability.

It is another object of the present invention to provide a charge control system and a charging method which permit a rechargeable battery to be charged with a voltage that is high but not so high as to cause the battery to be overcharged without provision of any reference power supply on the side of a charging circuit.

It is still another object of the present invention to provide a charge control system and a charging method which permit a current limiting function required to charge a rechargeable battery to be implemented with a simple arrangement.

According to a first aspect of the invention, there is provided a system for charging a device with constant voltage, comprising: means for supplying a voltage increased with time; means for outputting an overvoltage signal for a first predetermined period when a supplied voltage to the device exceed a reference voltage; means, in response to the overvoltage signal from the outputting means, for gradually dropping the voltage from the supplying means for a second predetermined period being longer than the first period; and means for holding the voltage from the supplying means when the voltage from the supplying means is lower than a held voltage and the overvoltage signal is not output from the outputting means, and sampling the voltage from the supplying means when the voltage from the supplying means is higher than the held voltage or the overvoltage signal is output from the outputting means, the held or the sampled voltage being supplied to the device.

According to a second aspect of the invention, there is provided a system for charging a device with constant voltage, comprising: means for supplying a voltage increased with time; means for outputting an overvoltage signal for a first predetermined period when a supplied voltage to the device exceed a reference voltage; means, in response to the overvoltage signal from the outputting means, for gradually dropping the voltage from the supplying means for a second predetermined period being longer than the first period; means for holding the voltage from the supplying means when the voltage from the supplying means is lower than a held voltage and the overvoltage signal is not output from the outputting means, and sampling the voltage from the supplying means when the voltage from the supplying means is higher than the held voltage or the overvoltage signal is output from the outputting means; means for limiting the held or the sampled voltage from the sampling and holding means to a predetermined value; and means for supplying a current corresponding to the voltage limited by the limiting means to the device.

In each of the charge control systems, the device bay be a rechargeable battery. In this case, the system may further comprise a pack housing the rechargeable battery. The output means may be built in the pack. The dropping means may include a multivibrator. In this case, the multivibrator and the holding/sampling means may be built in one integrated circuit.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 shows a circuit arrangement of a charge control system according to a first embodiment of the present invention;

FIG. 5 shows a circuit arrangement of a charge control system according to a fifth embodiment of the present invention;

FIG. 6 shows a circuit arrangement of a charge control system according to a sixth embodiment of the present invention;

FIGS. 7A to 7D are waveform diagrams of electrical signals developed at various locations within the circuit arrangement of FIG. 1;

FIGS. 8A to 8D are waveform diagrams of electrical signals developed at various locations within the circuit arrangement of FIG. 2;

FIGS. 9A to 9D are waveform diagrams of electrical signals developed at various locations within the circuit arrangement of FIG. 3;

FIGS. 10A to 10D are waveform diagrams of electrical signals developed at various locations within the circuit arrangement of FIG. 4;

FIGS. 11A to 11D are waveform diagrams of electrical signals developed at various locations within the circuit arrangement of FIG. 5;

FIGS. 12A to 12D are waveform diagrams of electrical signals developed at various locations within the circuit arrangement of FIG. 6; and FIGS. 13A to 13F show modifications of constant-current sources used in the circuit arrangements of FIGS. 1 to 6.

DETAILED DESCRIPTION OF THE INVENTION

Figure 2:
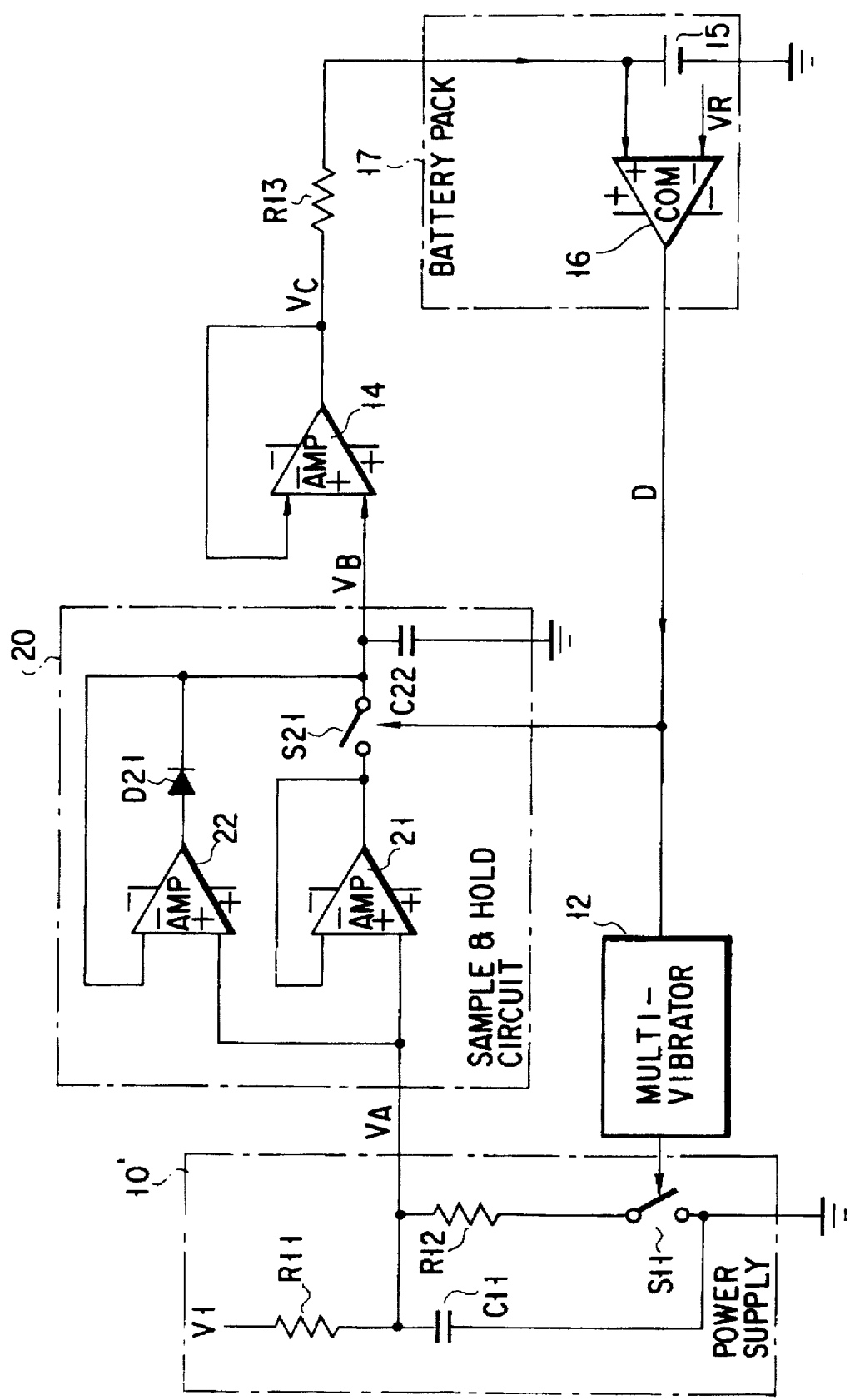
FIG. 2 shows a circuit arrangement of a charge control system according to a second embodiment of the present invention.

Hereinafter, the embodiments of the invention will be described with reference to the accompanying drawings.

First Embodiment

FIG. 1 shows a circuit arrangement of a charge control system according to a first embodiment of the present invention. In FIG. 1, well-known components (for example, initialization function at power-on time, power supplies for operating operational amplifiers, comparators, an OR circuit, etc.) are not shown and descriptions thereof are omitted. On the other hand, FIGS. 7A to 7D show changes in state of electrical signals developed at various locations within the circuit arrangement of FIG. 1.

The charge control system of FIG. 1 is built into a personal computer, for example. In this case, a rechargeable battery, which is an object of charge control, is put aboard the personal computer in a state where it is built in a battery pack.

As shown in FIG. 1, a power supply 10 comprises constant-current circuits CC11 and CC12, a capacitor C11, and a switch S11.

Within the power supply 10, a voltage V1 is produced and then applied to the constant-current circuit CC11, which produces a current corresponding to the voltage V1. A voltage from the constant-current circuit CC11 is applied to the capacitor C11 and a sample and hold circuit 13. The voltage VA to the sample and hold circuit 13 increases with time while the switch S11 is open.

The capacitor C11 holds the voltage VA and stores the amount of charge corresponding to the voltage from the constant-current circuit CC11. The charges on the capacitor C11 are discharged through the constant-current circuit CC12 when the switch S11 becomes closed. When the charges stored on the capacitor are discharged, the voltage VA to the sample and hold circuit 13 falls.

The constant-current circuit CC12 is one that outputs a current corresponding to the voltage VA. When the switch S11 is closed, a current flows through the constant-current circuit CC12. The current flowing through the circuit CC12 is greater than that flowing through the circuit CC11.

The switch S11 is switched on or off by a one-shot multivibrator 12. When switched on, the switch allows the capacitor C11 to be discharged through the constant-current circuit CC12.

The one-shot multivibrator is implemented by a well-known device that is responsive to the increasing (or falling) edge of an input pulse to produce an output pulse of a predetermined period. The one-shot multivibrator is called a monostable multivibrator. Various such one-shot multivibrators are now commercially available in the form of integrated circuits (IC) from many manufacturers. Examples of integrated-circuit one-shot multivibrators include the Toshiba TC74H123A, TC74HC4538A, TC4047B, TC4528B and TC4538B, the Motorola MC14528 and MC14538B, etc.

The multivibrator responds to the rising edge of an overvoltage signal D from the battery pack 17 to provides an output signal for a predetermined period, during which period the switch S11 is kept closed. At this point, the capacitor C11 is discharged through the constant-current circuit CC12 and the switch S11, so that the voltage VA applied to the sample and hold circuit 13 falls.

After a lapse of the predetermined period, the multivibrator stops providing the output signal, setting the switch S11 back to the open state. Thus, the voltage VA restarts to increase with time.

The sample and hold circuit 13 is implemented by a well-known device that samples and holds an input signal (amplitude value). This device is switched between sample and hold modes by a control signal.

As long as the sample and hold circuit receives an output signal of the OR circuit 19, it provides an output voltage VB equal to the input voltage VA (sample mode). That is, when the input voltage VA increases, the output voltage VB also increases correspondingly and vice versa. In the absence of the output signal of the OR circuit, on the other hand, the sample and hold circuit 13 continues to provide an output voltage VB it provided immediately before the OR circuit stops providing the output signal (hold mode).

The operational amplifier 14, which consists of a voltage follower, provides an output voltage VC equal in magnitude to the voltage VB. A resistor R13 is intended to limit a charging current to a battery 15.

The rechargeable battery 15 is charged by the output of the operational amplifier 14. A comparator 16 acts as an overvoltage detector. The comparator 16 makes a comparison between the voltage across the rechargeable battery (the battery voltage) and a reference voltage VR to thereby output an overvoltage signal D when the battery voltage exceeds the reference voltage VR. The reference voltage VR provides a reference value used to detect whether or not the rechargeable battery is placed in overvoltage state. The overvoltage signal D is fed into the one-shot multivibrator 12 and the OR circuit 19. The rechargeable battery 15 and the comparator 16 are housed in the battery pack 17 as shown.

The battery pack has the rechargeable battery 15 and the comparator (overvoltage detector) 16 built in and is removably mounted in a personal computer not shown.

According to the present embodiment, the comparator 18 and the OR circuit 19 are provided as components to control the sample and hold circuit 13.

The comparator 18 makes a comparison between the input voltage VA and the output voltage VB of the sample and hold circuit 13 to provide an output signal when VA>VB.

The OR circuit 19 ORs the overvoltage signal D and the output signal of the comparator 18 to provide an output signal to the sample and hold circuit 13. That is, when VA>VB, the OR circuit 19 sets the sample and hold circuit 13 to the sample mode. Also, when the overvoltage signal D is output from the comparator 16, the OR circuit sets the sample and hold circuit to the sample mode.

Of the components of the charge control system, the multivibrator 12, the sample and hold circuit 13, the OR circuit 17 and the comparator 18 can be built in one integrated circuit.

Next, the operation of the charge control system of the present embodiment will be described with reference to FIGS. 1 and 7A to 7D.

How the rechargeable battery is charged will be described first.

When the voltage across the rechargeable battery 15 is lower than the output voltage VC of the operational amplifier 14, the battery is charged through the current limiting resistor R13, so that the battery voltage increases with time. When the battery voltage becomes equal to the output voltage VC of the operational amplifier 14, the charging is stopped. That is, the battery voltage eventually reaches the output voltage VC of the operational amplifier 14.

Since the operational amplifier 14 is a voltage follower, its output voltage VC is equal to the output voltage VB of the sample and hold circuit 13. That is, the voltage across the battery 15 becomes equal to the output voltage VB of the sample and hold circuit.

When the rechargeable battery 15 is not fully charged (when the battery voltage is considerably lower than the reference voltage VR), it takes long for the battery voltage to reach the reference voltage VR. If, on the other hand, the battery is almost fully charged, then the battery voltage immediately reaches the voltage VB. The operation when the battery is almost fully charged is the point of significance to the invention. Thus, unless otherwise specified, the operation will be described as VB=battery voltage.

The operation of the entire system of FIG. 1 will be described next.

Voltage variations at main points in FIG. 1 are illustrated in FIGS. 7A to 7D. That is, the state changes of the input voltage VA to the sample and hold circuit 13, the output voltage VB of the sample and hold circuit, the output voltage VC of the operational amplifier 14 and the overvoltage signal D of the comparator 16 are illustrated in FIGS. 7A, 7B, 7C, and 7D, respectively.

The operation will be described beginning with the state where the overvoltage signal D is not output and hence the voltage VA is lower than the voltage VB. Since the same operation is repeated, the description may be started at any point.

As shown in FIGS. 7A and 7B, at first, VA is lower than VB. At this point, the sample and hold circuit 13 is placed in the hold mode, so that it continues to output a certain voltage held as VB.

The switch S11 is open because the overvoltage signal D is not issued and the multivibrator 12 outputs no signal. For this reason, the capacitor C11 is charged, so that the voltage VA increases gradually. In this case, the voltage VA increases with time t as expressed by $$VA = (I1/C) t \quad (1)$$

where

I1=current of constant current circuit CC11

C=capacitance of capacitor C11

Thus, the voltage VA will increase linearly.

When the voltage VA increases and exceeds the output voltage VB of the sample and hold circuit 13, the comparator 18 outputs a trigger signal, which is applied to the sample and hold circuit 13 via the OR circuit 19.

Upon receipt of the trigger signal, the sample and hold circuit 13 is switched from the hold mode to the sample mode. The output voltage VB of the sample and hold circuit 13 will thereby increase with the increasing input voltage VA.

When the voltage VB exceeds the overvoltage level (reference voltage VR) of the rechargeable battery 15, the comparator 16 produces an overvoltage signal D.

Upon receipt of the overvoltage signal D, the one-shot multivibrator 12 provides an output signal for a predetermined period T1. Thus, the switch S11 is closed for the period T1, whereby the capacitor C11 is discharged through the constant current circuit CC12 and the switch S11. As a result, the voltage VA falls. In this case, the voltage VA falls with time t as expressed by $$VA = -\{(I2-I1)/C\} t \quad (2)$$

where

I1=current of constant current circuit CC11

I2=current of constant current circuit CC12

C=capacitance of capacitor C11

It will therefore be understood that the voltage VA falls linearly.

On the other hand, the comparator 16 produces the overvoltage signal D for a predetermined period T2 (much shorter than T1), during which period the OR circuit 19 applies a signal to the sample and hold circuit 13. Thus, the sample and hold circuit is held in the sample mode even if no trigger signal is applied thereto by the comparator 18 through the OR circuit 19. As a result, the output voltage VB of the sample and hold circuit will fall with the decreasing input voltage VA.

When the voltage VB falls to such an extent that the comparator 16 ceases outputting the overvoltage signal D (this fall corresponds to the hysteresis width of the comparator 16), the sample and hold circuit 13 is switched from the sample mode to the hold mode. Thereby, the sample and hold circuit then outputs the voltage VB as it was held at that point.

After the sample and hold circuit has been switched to the hold mode, the one-shot multivibrator 12 remains outputting the signal. Thus, the voltage VA continues to further fall.

After a lapse of the predetermined period T1, the multivibrator ceases outputting the signal, thereby turning the switch S11 off. Thus, the capacitor C11 becomes recharged. As a result, the voltage VA commences to increase.

The above operation is performed repeatedly.

The battery voltage eventually reaches a value that is less than the reference value VR by the hysteresis value of the comparator 16.

Second Embodiment

FIG. 2 shows a circuit arrangement of a charge control system according to a second embodiment of the present invention. FIGS. 8A to 8D show changes in state of electrical signals developed at various locations within the circuit arrangement of FIG. 2.

In FIG. 2, like reference numerals are used to denote corresponding components to those in FIG. 1 and descriptions thereof are omitted.

In the second embodiment, a power supply 10' is used which differs in arrangement from the power supply 10 in the first embodiment. That is, whereas the constant current circuits CC11 and CC12 are used in the power supply 10 of the first embodiment, resistors R11 and R12 are used in the power supply 10' of the second embodiment. For this reason, in the first embodiment, the voltage VA increases/falls linearly, while, in the second embodiment, that increases/falls non-linearly as will be described later.

In addition, in the second embodiment, a sample and hold circuit (voltage control circuit) 20 is used in place of the sample and hold circuit 13, the comparator 18 and the OR circuit 19 in the first embodiment.

The sample and hold circuit 20 comprises operational amplifiers 21 and 22, a diode D21, a capacitor C22, and a switch S21.

The operational amplifier 21 consists of a voltage follower and provides an output voltage equal in magnitude to its input voltage VA. The operational amplifier 22 also consists of a voltage follower and provides an output voltage equal in magnitude to its input voltage VA.

The diode D21 conducts an output signal of the operational amplifier 22 in the forward direction. The capacitor C22 holds a voltage VB. The switch S21 is held open as long as it receives an overvoltage signal D from the comparator 16.

Of components constituting the charge control system, the multivibrator 12 and the sample and hold circuit 20 can be built in one integrated circuit.

The operation of the charge control system of the present embodiment will be described next with reference to FIGS. 2 and 8A to 8D.

Voltage variations at main points in FIG. 2 are illustrated in FIGS. 8A to 8D. That is, the state changes of the input voltage VA to the Sample and hold circuit 20, the output voltage VB of the sample and hold circuit, the output voltage VC of the operational amplifier 14 and the overvoltage signal D of the comparator 16 are illustrated in FIGS. 8A, 8B, 8C, and 8D, respectively.

The operation will be described beginning with the state where the overvoltage signal D is not output and hence the voltage VA is lower than the voltage VB. Since the same operation is repeated, the description may be started at any point.

As shown in FIGS. 8A and 8B, at first, VA is lower than VB. At this point, the sample and hold circuit 20 is placed in the hold mode, so that it continues to output a certain voltage held as VB. The diode D21 is reverse-biased, so that it is in the off state.

Since the overvoltage signal D is not issued, the switch S21 is also placed in the off state. Thus, the capacitor C22 is charged or discharged by a bias current in the operational amplifier and discharged by a leakage current in each of the switch S21 and the diode D21. These currents are very low. The voltage VB merely changes very slightly as time progresses.

The switch S11 is open because the overvoltage signal D is not issued and the multivibrator 12 outputs no signal. For this reason, the capacitor C11 is charged, so that the voltage VA increases gradually. In this case, the voltage VA increases with time t as expressed by $$VA = Vi\{1-\exp(-t/CR)\} \qquad (3)$$

where

C=capacitance of capacitor C11

R=resistance of resistor R11

Thus, the voltage VA will increase non-linearly.

When the voltage VA increases and exceeds the output voltage VB of the sample and hold circuit 13, the diode D21 is turned on. As a result, the sample and hold circuit 20 is switched from the hold mode to the sample mode. The output voltage VB of the sample and hold circuit 13 will thereby increase with the increasing input voltage VA.

When the voltage VB exceeds the overvoltage level (reference voltage VR) of the rechargeable battery 15, the comparator 16 produces an overvoltage signal D.

Upon receipt of the overvoltage signal D, the one-shot multivibrator 12 provides an output signal for a predetermined period T1. Thus, the switch S11 is closed for the period T1, whereby the capacitor C11 is discharged through the resistor R12 and the switch S11. As a result, the voltage VA continues to fall.

On the other hand, the comparator 16 produces the overvoltage signal D for a predetermined period T2 (much shorter than T1), during which period the switch S21 is held open. Thus, current will flow through the switch S21 and the operational amplifier 21 from the Vb side to the VA side. As a result, the output voltage VB of the sample and hold circuit will fall with the decreasing input voltage VA.

When the voltage VB falls to such an extent that the comparator 16 ceases outputting the overvoltage signal D (this fall corresponds to the hysteresis width of the comparator 16), the switch S21 is turned off. Thereby, the sample and hold circuit 20 then outputs the voltage VB as it was held at that point. That is, the sample and hold circuit is switched from the sample mode to the hold mode.

After the sample and hold circuit has been switched to the hold mode, the one-shot multivibrator 12 remains outputting the signal. Thus, the voltage VA continues to further fall.

After a lapse of the predetermined period T1, the multivibrator ceases outputting the signal, thereby turning the switch S11 off. Thus, the capacitor C11 becomes recharged. As a result, the voltage VA commences to increase.

The above operation is performed repeatedly.

The battery voltage eventually reaches a value that is less than the reference value VR by the hysteresis value of the comparator 16.

Third Embodiment

Figure 3:
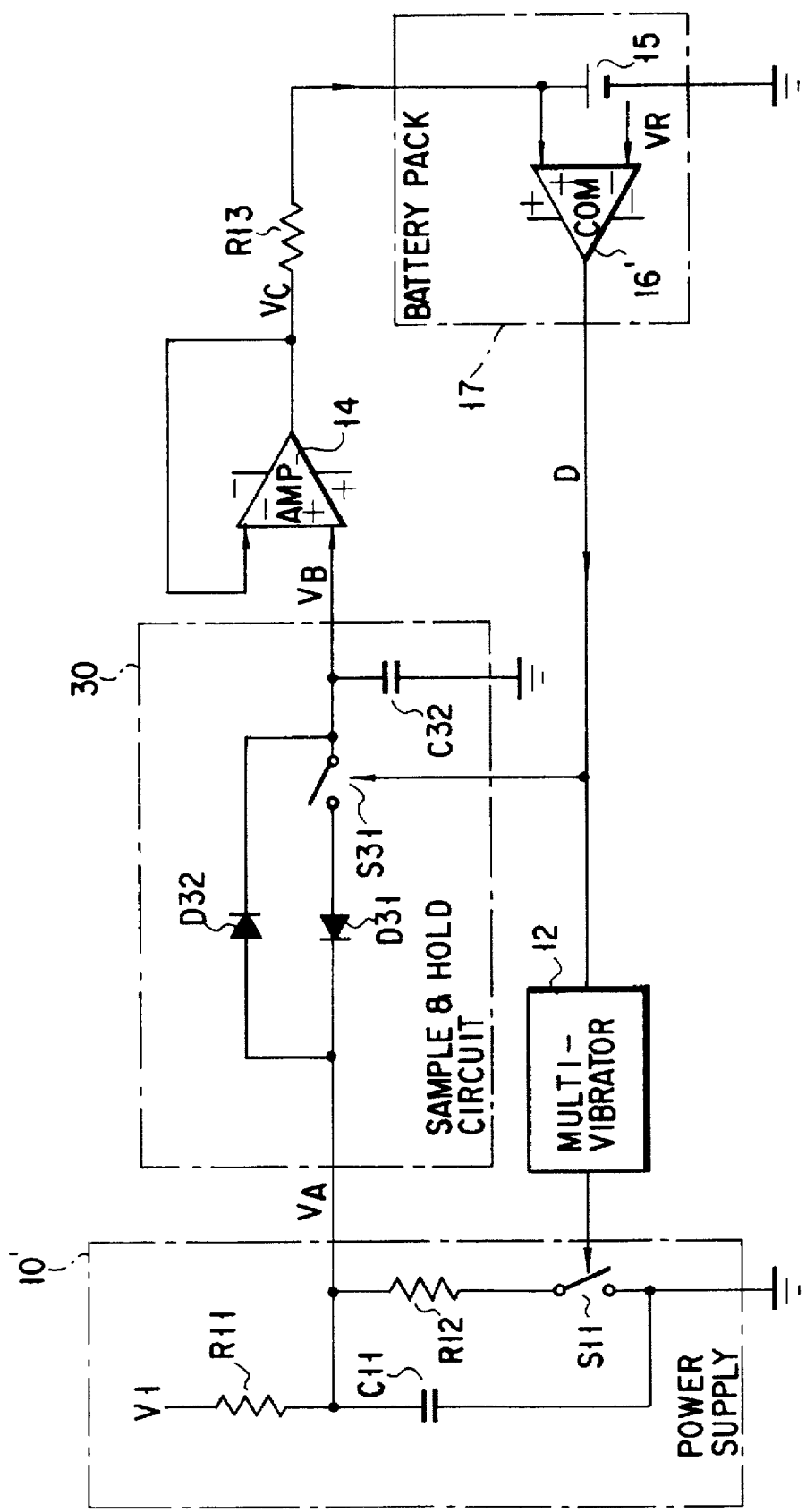
FIG. 3 shows a circuit arrangement of a charge control system according to a third embodiment of the present invention.

FIG. 3 shows a circuit arrangement of a charge control system according to a third embodiment of the present invention. FIGS. 9A to 9D show changes in state of electrical signals developed at various locations within the circuit arrangement of FIG. 3.

In FIG. 3, like reference numerals are used to denote corresponding components to those in FIG. 2 and descriptions thereof are omitted.

In the third embodiment, a sample and hold circuit (voltage control circuit) 30 is used in place of the sample and hold circuit 20 in the first embodiment.

The sample and hold circuit 30 comprises operational diodes D31 and D32, a switch S31, and a capacitor C32.

The diodes D31 and D32 are parallel connected such that their polarities are opposite to each other. The switch S31 is connected in series with the diode D31 and placed in the on state while the comparator 16' provides an overvoltage signal D. The capacitor C32 holds the voltage VB.

Although the comparator 16 in the second embodiment has a hysteresis characteristic, the comparator 16' in the third embodiment has no requirement of having it. This is because, in the third embodiment, the diodes D31 and D32 have the hysteresis function.

Of components constituting the charge control system, the multivibrator 12 and the sample and hold circuit 30 can be built into one integrated circuit.

The operation of the charge control system of the present embodiment will be described next with reference to FIGS. 3 and 9A to 9D.

Voltage variations at main points in FIG. 3 are illustrated in FIGS. 9A to 9D. That is, the state changes of the input voltage VA to the sample and hold circuit 30, the output voltage VB of the sample and hold circuit, the output voltage VC of the operational amplifier 14 and the overvoltage signal D of the comparator 16' are illustrated in FIGS. 9A, 9B, 9C, and 9D, respectively.

The operation will be described beginning with the state where the overvoltage signal D is not output and hence the voltage VA is lower than the voltage VB. Since the same operation is repeated, the description may be started at any point.

As shown in FIGS. 9A and 9B, at first, VA is lower than VB. At this point, the sample and hold circuit 30 is placed in the hold mode, so that it continues to output a certain voltage held as VB. The diode D32 is reverse-biased, so that it is in the off state.

Since the overvoltage signal D is not issued, the switch S31 is also placed in the off state. Thus, the capacitor C32 is charged or discharged by a bias current in the operational amplifier 14 and discharged by a leakage current in each of the switch S31 and the diode D32. These currents are very low. The voltage VB merely changes very slightly as time progresses.

The switch S11 is open because the overvoltage signal D is not issued and the multivibrator 12 outputs no signal. For this reason, the capacitor C11 is charged, so that the voltage VA increases gradually.

When the increasing voltage VA and the voltage VB held by the sample and hold circuit come to have a magnitude relationship such that VA+Vf2>VB where Vf2 is the forward voltage drop across the diode D32, the diode D32 is turned on. As a result, the sample and hold circuit 20 is switched from the hold mode to the sample mode. The output voltage VB of the sample and hold circuit 20 will thereby increase with the increasing input voltage VA.

When the voltage VB exceeds the overvoltage level (reference voltage VR) of the rechargeable battery 15, the comparator 16 produces an overvoltage signal D.

Upon receipt of the overvoltage signal D, the one-shot multivibrator 12 provides an output signal for a predetermined period T1. Thus, the switch S11 is closed for the period T1, whereby the capacitor C11 is discharged through the resistor R12 and the switch S11. As a result, the voltage VA continues to fall.

On the other hand, the comparator 16 produces the overvoltage signal D for a predetermined period T2 (much shorter than T1). During this period the switch S31 is held open.

Even if the switch S31 is turned on, the diode D31 will not be turned on immediately. It is not until VA and VB come to have a magnitude relationship such that VA+Vf1<VB where Vf1 is the forward voltage drop across the diode D31 that the diode D31 is turned on. After the diode D31 has been turned on, the voltage Vb will fall.

When the voltage VB falls to such an extent that the comparator 16 ceases outputting the overvoltage signal D (i.e., after a lapse of the period T2), the switch S31 is turned off. Thereby, the sample and hold circuit 30 then outputs the voltage VB as it was held at that point. That is, the sample and hold circuit is switched from the sample mode to the hold mode.

After the sample and hold circuit has been switched to the hold mode, the one-shot multivibrator 12 remains outputting the signal. Thus, the voltage VA continues to further fall.

After a lapse of the period T1, the multivibrator ceases outputting the signal, thereby turning the switch S11 off. Thus, the capacitor C11 becomes recharged. As a result, the voltage VA commences to increase.

The above operation is performed repeatedly, so that the battery voltage eventually reaches the reference value VR.

Fourth Embodiment

Figure 4:
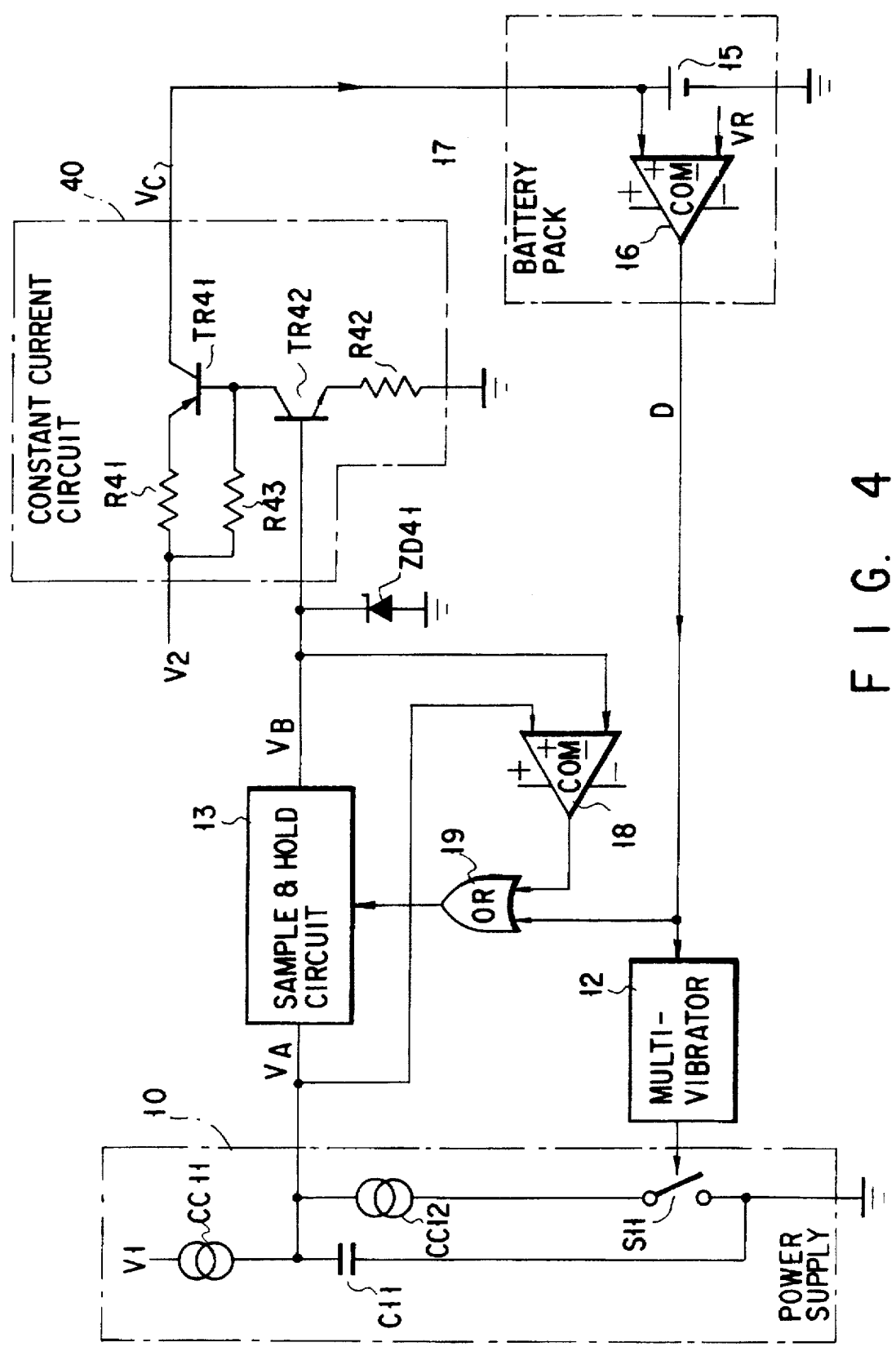
FIG. 4 shows a circuit arrangement of a charge control system according to a fourth embodiment of the present invention.

FIG. 4 shows a circuit arrangement of a charge control system according to a fourth embodiment of the present invention. FIGS. 10A to 10D show changes in state of electrical signals developed at various locations within the circuit arrangement of FIG. 4.

In FIG. 4, like reference numerals are used to denote corresponding components to those in FIG. 1 (the first embodiment) and descriptions thereof are omitted.

Although, in the first embodiment, the constant voltage circuit consisting of the operational amplifier 14 and the resistor R13 is used, a constant current circuit 40 is used instead in the fourth embodiment. The constant current circuit 40 is constructed from transistors TR41 and TR42 and resistors R41 to R43. The constant current circuit 40 is supplied with a voltage V2 required to charge the rechargeable battery 15.

The fourth embodiment is further provided with a zener diode ZD41, which is intended to limit the output voltage VB of the sample and hold circuit 13 to a predetermined value or less.

First, how the rechargeable battery 15 is charged will be described.

The constant current circuit 40 itself, constructed from the transistors TR41 and TR42 and resistors R41 to R43, is a well-known circuit. The constant current circuit is arranged such that a current corresponding to the output voltage VB of the sample and hold circuit 13 will flow through the collector of the transistor TR41. That is, a current corresponding in magnitude to the voltage VB flows through the rechargeable battery 15, thereby charging it.

Next, the operation of the charge control system of FIG. 4 will be described.

The detection of the battery voltage, the production of the overvoltage signal D and the change of the voltage VB are substantially the same as those described in connection with the first embodiment. The only different point is that the maximum value of the voltage VB is subjected to limitation by the zener diode ZD41. Thus, the overvoltage signal D, voltage variations in the rechargeable battery 15 and the limitation of the voltage VB will be described herein.

Voltage variations at main points in FIG. 4 are illustrated in FIGS. 10A to 10D. That is, the variations in the input voltage VA to the sample and hold circuit 13, the output voltage VB of the sample and hold circuit, the output voltage VC of the operational amplifier 14 and the overvoltage signal D of the comparator 16 are illustrated in FIGS. 10A, 10B, 10C, and 10D, respectively. These figures show only the operation range over which the voltage VB is limited as time progresses.

The operation will be described beginning with the state where the battery voltage is low and hence the overvoltage signal D is not output. Since the same operation is repeated, the description may be started at any point.

Since the overvoltage signal D is not output, the voltage VB is increasing (not shown). Correspondingly, the charging current to the rechargeable battery 15 is also increasing (not shown).

Even if the battery 15 is supplied with the charging current, its voltage does not immediately reach the target voltage value VR. That is, the voltage VB will increase until the overvoltage signal D is produced (not shown).

However, the voltage VB will be limited to a certain magnitude determined by the zener diode ZD41 (the initial voltage value shown in FIG. 10B). That is, the battery current will be limited to a fixed value.

When the overvoltage signal D is produced as a result of the progress of charging and the elevation of the battery voltage, the voltage VB is held at a certain value (as opposed to a value determined by the zener diode ZD41) as in the first embodiment.

When the overvoltage signal D is produced, the voltage VB is required to stop increasing and lower (by the hysteresis width of the comparator 16) until the overvoltage signal D is extinguished. This will be described below.

When a current flows through the battery 15 and overvoltage is detected by the comparator 16, the voltage VB begins to fall. That is, the charging current also decreases.

The rechargeable battery that has not become fully charged has a property that the battery voltage falls as the charging current decreases. Thus, the battery voltage falls with the decreasing voltage VB and then falls below the overvoltage detection level (VR).

After that, the same operation as in the first embodiment is performed. Thus, the battery voltage will eventually reach the value that is lower than the reference value VR by the hysteresis value of the comparator 16.

Fifth Embodiment

FIG. 5 shows a circuit arrangement of a charge control system according to a fifth embodiment of the present invention. FIGS. 11A to 11D show changes in state of electrical signals developed at various locations within the circuit arrangement of FIG. 5.

In the circuit arrangement of FIG. 5, the constant voltage circuit consisting of the operational amplifier 14 and the resistor R13 in the second embodiment of FIG. 2 is replaced with the constant current circuit 40 in the fourth embodiment of FIG. 4. Each component has the same function as described in connection with these embodiments.

The operation of the fifth embodiment will be evident from the operation of the second and fourth embodiments. According to the fifth embodiment, the battery voltage eventually reaches a value that is lower than the reference value VR by the hysteresis value of the comparator 16.

Sixth Embodiment

FIG. 6 shows a circuit arrangement of a charge control system according to a sixth embodiment of the present invention. FIGS. 12A to 12D show changes in state of electrical signals developed at various locations within the circuit arrangement of FIG. 6.

In the circuit arrangement of FIG. 6, the constant voltage circuit consisting of the operational amplifier 14 and the resistor R13 in the third embodiment of FIG. 3 is replaced with the constant current circuit 40 in the fourth embodiment of FIG. 4. Each component has the same function as described in connection with these embodiments.

The operation of the fifth embodiment will be evident from the description of the operation of the second and fourth embodiments. According to the sixth embodiment, the battery voltage eventually reaches the reference value VR.

As described above, the present invention has an advantage of being capable of bringing out the inherent performance (capacity) of a rechargeable battery without sacrificing the safety (while keeping the same safety as prior arts), at a lower cost than the prior arts, with a small number of circuits, and at higher reliability than the prior arts.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

For example, the constant current circuit 40 used in the fourth, fifth and sixth embodiments shown in FIGS. 4 to 6 may be modified as shown in FIGS. 13A to 13F. The circuits shown in FIGS. 13A and 13B are each comprised of two transistors Tr and two resistors R. The circuit of FIG. 13C is constructed from a constant voltage source E and a MOS transistor Tr. The circuit of FIG. 13D consists of a constant voltage diode D. The circuit of FIG. 13E is constructed from a voltage source E, an operational amplifier AMP, a MOS transistor Tr, and a resistor R. The circuit of FIG. 13F comprises a constant voltage source E, a MOS transistor Tr, and a resistor R.

Although each of the embodiments was described in terms of charge control for a positive voltage, the invention is easily applicable to charge control for a negative voltage.

Although each of the embodiments was described as using a rechargeable battery as an object of charge control, the invention is also applicable to other devices, circuits or components than the rechargeable battery that require to be supplied with a constant voltage.

I claim:

1. A system for charging a device with constant voltage, comprising:

means for supplying a voltage increased with time;

means for outputting an overvoltage signal for a first predetermined period when a supplied voltage to the device exceed a reference voltage;

means, in response to the overvoltage signal from the outputting means, for gradually dropping the voltage from the supplying means for a second predetermined period being longer than the first period; and means for holding the voltage from the supplying means when the voltage from the supplying means is lower than a held voltage and the overvoltage signal is not output from the outputting means, and sampling the voltage from the supplying means when the voltage from the supplying means is higher than the held voltage or the overvoltage signal is output from the outputting means, the held or the sampled voltage being supplied to the device.

2. The system according to claim 1, wherein the device is a rechargeable battery.

3. The system according to claim 2, further comprising a pack housing the rechargeable battery.

4. The system according to claim 3, wherein the output means is built in the pack.

5. The system according to claim 1, wherein the dropping means includes a multivibrator.

6. The system according to claim 5, wherein the multivibrator and the holding/sampling means are built in one integrated circuit.

7. A system for charging a device with constant voltage, comprising:

means for supplying a voltage increased with time;

means for outputting an overvoltage signal for a first predetermined period when a supplied voltage to the device exceed a reference voltage;

means, in response to the overvoltage signal from the outputting means, for gradually dropping the voltage from the supplying means for a second predetermined period being longer than the first period;

means for holding the voltage from the supplying means when the voltage from the supplying means is lower than a held voltage and the overvoltage signal is not output from the outputting means, and sampling the voltage from the supplying means when the voltage from the supplying means is higher than the held voltage or the overvoltage signal is output from the outputting means;

means for limiting the held or the sampled voltage from the sampling and holding means to a predetermined value; and means for supplying a current corresponding to the voltage limited by the limiting means to the device.

8. The system according to claim 7, wherein the device is a rechargeable battery.

9. The system according to claim 8, further comprising a pack housing the rechargeable battery.

10. The system according to claim 9, wherein the output means is built in the pack.

11. The system according to claim 7, wherein the dropping means includes a multivibrator.

12. The system according to claim 11, wherein the multivibrator and the holding/sampling means are built in one integrated circuit.

13. A system for charging a rechargeable battery with constant voltage, comprising:

means for supplying a voltage increased with time;

means for outputting an overvoltage signal for a first predetermined period when a supplied voltage to the device exceed a reference voltage;

means, in response to the overvoltage signal from the outputting means, for gradually dropping the voltage from the supplying means for a second predetermined period being longer than the first period;

means for holding the voltage from the supplying means when a control signal is not supplied, and sampling the voltage from the supplying means when the control signal is supplied;

means for comparing the voltage from the supplying means with a held voltage of the sampling and holding means, and generating a signal when the voltage from the supplying means is higher than the held voltage from the sampling and holding means;

means for supplying the control signal to the sampling and holding means in response to the signal from the comparing means or the overvoltage signal from the outputting means; and means for supplying the held or the sampled voltage from the sampling and holding means to the device.

14. A system for charging a rechargeable battery with constant voltage, comprising:

means for supplying a voltage increased with time;

means for outputting an overvoltage signal for a first predetermined period when a supplied voltage to the device exceed a reference voltage;

means, in response to the overvoltage signal from the outputting means, for gradually dropping the voltage from the supplying means for a second predetermined period being longer than the first period;

first and second voltage follower means, connected in parallel to each other, for holding the voltage from the supplying means;

rectifier means, connected in series with the first voltage follower means, capable of being turned on when the voltage from the first voltage follower means exceeds a predetermined voltage;

switch means, connected in series with the second voltage follower means, capable of being turned on in response to the overvoltage signal from the outputting means;

capacitor means, connected to the rectifier means and switch means, capable of being charged when the switch means is off and being discharged when the switch means is on; and means for supplying the voltage from the capacitor means to the device.

15. A system for charging a rechargeable battery with constant voltage, comprising:

means for supplying a voltage increased with time;

means for outputting an overvoltage signal for a first predetermined period when a supplied voltage to the device exceed a reference voltage;

means, in response to the overvoltage signal from the outputting means, for gradually dropping the voltage from the supplying means for a second predetermined period being longer than the first period;

first and second rectifier means, connected in inverse-parallel to each other, the first rectifier means capable of being turned on when the voltage from the supplying means exceeds a first predetermined voltage, and the second rectifier means capable of being turned on when the voltage from the supplying means falls below a second predetermined voltage;

switch means, connected in series with the second rectifier means, capable of being turned on in response to the overvoltage signal from the outputting means;

capacitor means, connected to the first rectifier means and the switch means, capable of being charged when the switch means is off and being discharged when the switch means is on; and means for supplying the voltage from the capacitor means to the device.

16. A system for charging a rechargeable battery with constant voltage, comprising:

means for supplying a voltage increased with time;

means for outputting an overvoltage signal for a first predetermined period when a supplied voltage to the device exceed a reference voltage;

means, in response to the overvoltage signal from the outputting means, for gradually dropping the voltage from the supplying means for a second predetermined period being longer than the first period;

means for holding the voltage from the supplying means when a control signal is not supplied, and sampling the voltage from the supplying means when the control signal is supplied;

means for comparing the voltage from the supplying means with a held voltage of the sampling and holding means, and generating a signal when the voltage from the supplying means is higher than the held voltage of the sampling and holding means;

means for supplying the control signal to the sampling and holding means in response to the signal from the comparing means or the overvoltage signal from the outputting means;

means for limiting the held or the sampled voltage from the sampling and holding means to a predetermined value; and means for supplying a current corresponding to the voltage limited by the limiting means to the device.

17. A system for charging a rechargeable battery with constant voltage, comprising:

means for supplying a voltage increased with time;

means for outputting an overvoltage signal for a first predetermined period when a supplied voltage to the device exceed a reference voltage;

means, in response to the overvoltage signal from the outputting means, for gradually dropping the voltage from the supplying means for a second predetermined period being longer than the first period;

first and second voltage follower means, connected in parallel to each other, for holding the voltage from the supplying means;

rectifier means, connected in series with the first voltage follower means, capable of being turned on when the voltage from the first voltage follower means exceeds a predetermined voltage;

switch means, connected in series with the second voltage follower means, capable of being turned on in response to the overvoltage signal from the outputting means;

capacitor means, connected to the rectifier means and switch means, capable of being charged when the switch means is off and being discharged when the switch means is on;

means for limiting the voltage from the capacitor means to a predetermined value; and means for supplying a current corresponding to the voltage limited by the limiting means to the device.

18. A system for charging a rechargeable battery with constant voltage, comprising:

means for supplying a voltage increased with time;

means for outputting an overvoltage signal for a first predetermined period when a supplied voltage to the device exceed a reference voltage;

means, in response to the overvoltage signal from the outputting means, for gradually dropping the voltage from the supplying means for a second predetermined period being longer than the first period;

first and second rectifier means, connected in inverse-parallel to each other, the first rectifier means capable of being turned on when the voltage from the supplying means exceeds a first predetermined voltage, and the second rectifier means capable of being turned on when the voltage from the supplying means falls below a second predetermined voltage;

switch means, connected in series with the second rectifier means, capable of being turned on in response to the overvoltage signal from the outputting means;

capacitor means, connected to the first rectifier means and the switch means, capable of being charged when the switch means is off and being discharged when the switch means is on;

means for limiting the voltage from the capacitor means to a predetermined value; and means for supplying a current corresponding to the voltage limited by the limiting means to the device.

19. A system for charging a rechargeable battery with constant voltage, comprising:

a power supply for supplying a voltage increased with time;

an overvoltage generating circuit for outputting an overvoltage signal for a first predetermined period when a supplied voltage to the rechargeable battery exceed a reference voltage;

a multivibrator, in response to the overvoltage signal from the overvoltage generating circuit, for gradually dropping the voltage from the power supply for a second predetermined period being longer than the first period;

a sample/hold circuit for holding the voltage from the power supply when a control signal is not supplied, and sampling the voltage from the power supply when the control signal is supplied;

a comparator for comparing the voltage from the power supply with a held voltage of the sample/hold circuit, and generating a signal when the voltage from the power supply is higher than the held voltage of the sample/hold circuit;

a logical sum circuit for supplying the control signal to the sample/hold circuit in response to the signal from the comparator or the overvoltage signal from the overvoltage generating circuit; and a voltage follower for supplying the held or the sampled voltage from the sample/hold circuit to the rechargeable battery.

20. A system for charging a rechargeable battery with constant voltage, comprising:

a power supply for supplying a voltage increased with time;

an overvoltage generating circuit for outputting an overvoltage signal for a first predetermined period when a supplied voltage to the rechargeable battery exceed a reference voltage;

a multivibrator, in response to the overvoltage signal from the overvoltage generating circuit, for gradually dropping the voltage from the power supply for a second predetermined period being longer than the first period;

first and second voltage followers, connected in parallel to each other, for holding the voltage from the power supply;

a diode, connected in series with the first voltage follower, capable of being turned on when the voltage from the first voltage follower exceeds a predetermined voltage;

a switch, connected in series with the second voltage follower, capable of being turned on in response to the overvoltage signal from the overvoltage generating circuit;

a capacitor, connected to the diode and switch, capable of being charged when the switch is off and being discharged when the switch is on; and a voltage follower for supplying the voltage from the capacitor to the rechargeable battery.

21. A system for charging a rechargeable battery with constant voltage, comprising:

a power supply for supplying a voltage increased with time;

an overvoltage generating circuit for outputting an overvoltage signal for a first predetermined period when a supplied voltage to the rechargeable battery exceed a reference voltage;

a multivibrator, in response to the overvoltage signal from the overvoltage generating circuit, for gradually dropping the voltage from the power supply for a second predetermined period being longer than the first period;

first and second diodes, connected in inverse-parallel to each other, the first diode capable of being turned on when the voltage from the power supply exceeds a first predetermined voltage, and the second diode capable of being turned on when the voltage from the power supply falls below a second predetermined voltage;

a switch, connected in series with the second diode, capable of being turned on in response to the overvoltage signal from the overvoltage generating circuit;

a capacitor, connected to the first diode and the switch, capable of being charged when the switch is off and being discharged when the switch is on; and a voltage follower for supplying the voltage from the capacitor to the rechargeable battery.

22. A system for charging a rechargeable battery with constant voltage, comprising:

a power supply for supplying a voltage increased with time;

an overvoltage generating circuit for outputting an overvoltage signal for a first predetermined period when a supplied voltage to the rechargeable battery exceed a reference voltage;

a multivibrator, in response to the overvoltage signal from the overvoltage generating circuit, for gradually dropping the voltage from the power supply for a second predetermined period being longer than the first period;

a sample/hold circuit for holding the voltage from the power supply when a control signal is not supplied, and sampling the voltage from the power supply when the control signal is supplied;

a comparator for comparing the voltage from the power supply with a held voltage of the sample/hold circuit, and generating a signal when the voltage from the power supply is higher than the held voltage of the sample/hold circuit;

a logical sum circuit for supplying the control signal to the sample/hold circuit in response to the signal from the comparator or the overvoltage signal from the overvoltage generating circuit;

a zener diode for limiting the held or the sampled voltage from the sample/hold circuit to a predetermined value; and a constant current circuit for supplying a current corresponding to the voltage limited by the zener diode to the rechargeable battery.

23. A system for charging a rechargeable battery with constant voltage, comprising:

a power supply for supplying a voltage increased with time;

an overvoltage generating circuit for outputting an overvoltage signal for a first predetermined period when a supplied voltage to the rechargeable battery exceed a reference voltage;

a multivibrator, in response to the overvoltage signal from the overvoltage generating circuit, for gradually dropping the voltage from the power supply for a second predetermined period being longer than the first period;

first and second voltage followers, connected in parallel to each other, for holding the voltage from the power supply;

a diode, connected in series with the first voltage follower, capable of being turned on when the voltage from the first voltage follower exceeds a predetermined voltage;

a switch, connected in series with the second voltage follower, capable of being turned on in response to the overvoltage signal from the overvoltage generating circuit;

a capacitor, connected to the diode and switch, capable of being charged when the switch is off and being discharged when the switch is on;

a zener diode for limiting the voltage from the capacitor to a predetermined value; and a constant current circuit for supplying a current corresponding to the voltage limited by the zener diode to the rechargeable battery.

24. A system for charging a rechargeable battery with constant voltage, comprising:

a power supply for supplying a voltage increased with time;

an overvoltage generating circuit for outputting an overvoltage signal for a first predetermined period when a supplied voltage to the rechargeable battery exceed a reference voltage;

a multivibrator, in response to the overvoltage signal from the overvoltage generating circuit, for gradually dropping the voltage from the power supply for a second predetermined period being longer than the first period;

first and second diodes, connected in inverse-parallel to each other, the first diode capable of being turned on when the voltage from the power supply exceeds a first predetermined voltage, and the second diode capable of being turned on when the voltage from the power supply falls below a second predetermined voltage;

a switch, connected in series with the second diode, capable of being turned on in response to the overvoltage signal from the overvoltage generating circuit;

a capacitor, connected to the first diode and the switch, capable of being charged when the switch is off and being discharged when the switch is on;

a zener diode for limiting the voltage from the capacitor to a predetermined value; and a constant current circuit for supplying a current corresponding to the voltage limited by the zener diode to the rechargeable battery.

25. A method of charging a battery with a constant voltage used for a system comprising a power supply supplying a voltage and a sample/hold circuit sampling or holding the voltage, the method comprising the steps of:

gradually increasing the voltage from the power supply with time;

sampling the increased voltage, the increased voltage being supplied to the battery;

outputting an overvoltage signal for a first predetermined period when the increased voltage is higher than a reference voltage;

gradually dropping the voltage from the power supply for a second predetermined period being longer than the first predetermined period in response to the overvoltage signal, the voltage from the power supply being increased when the second period is elapsed;

sampling the dropped voltage for the first period, the dropped voltage being supplied to the battery; and holding a voltage when the first period is elapsed, the held voltage being supplied to the battery.

26. A method of charging a battery with a constant voltage used for a system comprising a power supply supplying a voltage and a sample/hold circuit sampling or holding the voltage, the method comprising the steps of:

gradually increasing the voltage from the power supply with time;

sampling the increased voltage;

limiting the sampled voltage to a predetermined value, a current corresponding to the limited being supplied to the battery;

outputting an overvoltage signal for a first predetermined period when the voltage supplied to the battery is higher than a reference voltage;

gradually dropping the voltage from the power supply for a second predetermined period being longer than the first predetermined period in response to the overvoltage signal, the voltage from the power supply being increased when the second period is elapsed;

sampling the dropped voltage for the first period;

limiting the sampled voltage to a predetermined value, a current corresponding to the limited being supplied to the battery;

holding a voltage when the first period is elapsed; and limiting the held voltage to a predetermined value, a current corresponding to the limited being supplied to the battery.

* * * * *

UNITED STATES PATENT AND TRADEMARK OFFICE
CERTIFICATE OF CORRECTION

PATENT NO. : 5,721,480
DATED : February 24, 1998
INVENTOR(S) : Shizuo Morioka

It is certified that error appears in the above-indentified patent and that said Letters Patent is hereby corrected as shown below:

Title Page, Item [57], line 5, "exceed" should read --exceeds--.

In Claim 1, col. 13, line 22, "exceed" should read --exceeds--.

In Claim 7, col. 13, line 52, "exceed" should read --exceeds--.

In Claim 13, col. 14, line 20, "exceed" should read --exceeds--.

In Claim 14, col. 14, line 46, "exceed" should read --exceeds--.

In Claim 15, col. 15, line 6, "exceed" should read --exceeds--.

In Claim 16, col. 15, line 33, "exceed" should read --exceeds--.

In Claim 17, col. 15, line 63, "exceed" should read --exceeds--.

In Claim 18, col. 16, line 25, "exceed" should read --exceeds--.

UNITED STATES PATENT AND TRADEMARK OFFICE
CERTIFICATE OF CORRECTION

PATENT NO. : 5,721,480
DATED : February 24, 1998
INVENTOR(S) : Shizuo Morioka

It is certified that error appears in the above-indentified patent and that said Letters Patent is hereby corrected as shown below:

In Claim 19, col. 16, line 56, "exceed" should read --exceeds--.

In Claim 20, col. 17, line 18, "exceed" should read --exceeds--

In Claim 21, col. 17, line 45, "exceed" should read --exceeds--.

In Claim 22, col. 18, line 5, "exceed" should read --exceeds--.

In Claim 23, col. 18, line 37, "exceed" should read --exceeds--.

In Claim 24, col. 19, line 1, "exceed" should read --exceeds--.

Signed and Sealed this

Fifteenth Day of May, 2001

*Attest:*

NICHOLAS P. GODICI

*Attesting Officer*   Acting Director of the United States Patent and Trademark Office